(12) United States Patent
Zhu et al.

(10) Patent No.: US 11,391,617 B2
(45) Date of Patent: Jul. 19, 2022

(54) WEIGHT-BEARING MEASUREMENT DEVICE AND METHOD AND WEIGHT-BEARING EQUIPMENT

(71) Applicant: GOERTEK INC., Weifang (CN)

(72) Inventors: Jian Zhu, Weifang (CN); Xiangdong Zhang, Weifang (CN); Zhenyu Yu, Weifang (CN); Zhiping Luo, Weifang (CN); Dong Yan, Weifang (CN)

(73) Assignee: GOERTEK INC., Shandong (CN)

( * ) Notice: Subject to any disclaimer, the term of this patent is extended or adjusted under 35 U.S.C. 154(b) by 685 days.

(21) Appl. No.: 16/303,481

(22) PCT Filed: May 22, 2018

(86) PCT No.: PCT/CN2018/087909
§ 371 (c)(1),
(2) Date: Nov. 20, 2018

(87) PCT Pub. No.: WO2019/047560
PCT Pub. Date: Mar. 14, 2019

(65) Prior Publication Data
US 2021/0223092 A1    Jul. 22, 2021

(30) Foreign Application Priority Data

Sep. 7, 2017 (CN) .......................... 201710802292.4

(51) Int. Cl.
*G01G 3/142* (2006.01)
*G01G 3/14* (2006.01)
(Continued)

(52) U.S. Cl.
CPC ........... *G01G 3/142* (2013.01); *G01G 3/1404* (2013.01); *G01G 19/08* (2013.01); *G01P 15/18* (2013.01)

(58) Field of Classification Search
CPC .. G01G 13/1404; G01G 13/142; G01G 19/08; G01P 15/18
See application file for complete search history.

(56) References Cited

U.S. PATENT DOCUMENTS 3,800,895 A * 4/1974 Gale ...................... G01G 19/12
177/136
2008/0264141 A1   10/2008 Kenmochi
(Continued)

FOREIGN PATENT DOCUMENTS

CN    101294842 A    10/2008
CN    101441102 A    5/2009
(Continued)

*Primary Examiner* — Natalie Huls
(74) *Attorney, Agent, or Firm* — Saliwanchik, Lloyd & Eisenschenk (57) ABSTRACT

The present invention discloses a weight-bearing measurement device and method and weight-bearing equipment. The weight-bearing measurement device comprises a weight sensor, an acceleration sensor and a processing unit, wherein the weight sensor comprises a deformable body and a bridge circuit, the deformable body deforms under the action of gravity of a borne object, the bridge circuit comprises at least one resistance strain gauge disposed on the deformable body and is configured to generate an output voltage that represents the deformation under the action of an input voltage; the acceleration sensor is configured to generate acceleration components in three directions perpendicular to one another respectively under the action of gravity of the borne object; and the processing unit is configured to calculate the gravity and/or the mass of the borne object in accordance with the acceleration components in the three directions, the input voltage, the output voltage, and conversion coefficients of the bridge circuit in the three directions.

16 Claims, 3 Drawing Sheets

(51) Int. Cl.
 *G01G 19/08* (2006.01)
 *G01P 15/18* (2013.01)

(56) References Cited

U.S. PATENT DOCUMENTS

| | | | | |
|---|---|---|---|---|
| 2011/0120235 A1* | 5/2011 | Shin | ............ | G01G 3/1404 |
| | | | | 73/862.636 |
| 2015/0046002 A1* | 2/2015 | Shih | ............ | B62M 7/12 |
| | | | | 701/22 |
| 2018/0170395 A1* | 6/2018 | Luo | ............ | G05D 1/0088 |
| 2018/0334214 A1* | 11/2018 | Cuban | ............ | B62J 15/02 |
| 2019/0179329 A1* | 6/2019 | Keivan | ............ | G05D 1/0246 |
| 2019/0384280 A1* | 12/2019 | Osawa | ............ | G05D 1/0088 |
| 2020/0283279 A1* | 9/2020 | Chow | ............ | B66F 17/003 |
| 2020/0307776 A1* | 10/2020 | Coco | ............ | G01G 19/022 |

FOREIGN PATENT DOCUMENTS

| | | | |
|---|---|---|---|
| CN | 102778287 | A | 11/2012 |
| CN | 106020181 | A | 10/2016 |
| CN | 205679999 | U | 11/2016 |
| CN | 107702773 | A | 2/2018 |
| JP | 2001255216 | A | 9/2001 |
| JP | 2010133785 | A | 6/2010 |

* cited by examiner

Acquiring acceleration components, detected by an acceleration sensor, of a deformable body under the action of gravity of a borne object in a U direction, a V direction and a W direction in case of weight bearing, wherein the W direction is perpendicular to a bearing face of the deformable body, and the U direction, the V direction and the W direction are perpendicular to one another respectively  ~S6010

Acquiring an input voltage of a bridge circuit and an output voltage of the bridge circuit in case of weight bearing  ~S6020

Calculating the gravity and/or the mass of the borne object in accordance with the acceleration components in the U direction, the V direction and the W direction, the input voltage, the output voltage and conversion coefficients of the bridge circuit in the U direction, the V direction and the W direction  ~S6030

WEIGHT-BEARING MEASUREMENT DEVICE AND METHOD AND WEIGHT-BEARING EQUIPMENT

CROSS REFERENCE TO RELATED APPLICATIONS

This application is a National Stage of International Application No. PCT/CN2018/087909, filed on May 22, 2018, which claims priority to Chinese Patent Application No. 201710802292.4, filed on Sep. 7, 2017, both of which are hereby incorporated by reference in their entireties.

TECHNICAL FIELD

The present invention relates to the technical field of weight-bearing measurement, and more particularly to weight-bearing equipment and a weight-bearing measurement device and method for the weight-bearing equipment.

BACKGROUND

With gradual development of technologies, more and more weight-bearing movement devices have come into view. These weight-bearing movement devices have been accepted by the general users because they may bring convenience to people's lives and work. For example, the weight-bearing movement devices are relatively more popular balance car products that may meet the demands for short journeys of the users, or intelligent AGVs (Automated Guided Vehicles) for goods delivery, which may meet the demands for automatic goods carrying of factories.

A weight-bearing movement device has the characteristics of weight bearing and movement. For these two functions, the weight-bearing movement device needs to be equipped with various movement-related sensors to ensure its own normal weight bearing and movement and to prevent undesirable statuses.

Among these sensors, a weight sensor plays a very important role and may associate the two functions of weight bearing and movement, such that a movement control system of the weight-bearing movement device may control an output torque of a motor in accordance with the gravity and/or the mass of a borne object to further guarantee the movement smoothness of the weight-bearing movement device. This shows that the measurement accuracy of the weight sensor may directly affect control of the motor. For example, in the working process of a balance car, a motor control system should always pay attention to weight bearing of the balance car and send a reasonable PWM (Pulse-Width Modulation) control signal to the motor to control its working current which in turn controls the output torque of the motor.

A conventional weight-bearing measurement method is implemented based on the assumption that the gravity of the borne object is perpendicular to a deformable body of the weight sensor (i.e., the deformable body of the weight sensor is always in a horizontal status by default). Therefore, this measurement only considers deformation of the deformable body in a direction of gravity. When the weight-bearing movement device tilts during movement, the weight sensor is in a tilted status, such that accurate gravity or mass data of the borne object may not be obtained through this measurement method when a bearing face of the deformable body is no longer perpendicular to the gravity of the borne object. This may result in an excessively large or small output torque of the motor. Consequently, the weight-bearing movement device is unbalanced and ultimately may not work normally.

SUMMARY

An objective of an embodiment of the present invention is to provide a novel technical solution for measuring the gravity and/or the mass of a borne object such that the gravity and/or the mass of the object may be accurately measured when a bearing face of the borne object is tilted.

According to a first aspect of the present invention, there is provided a weight-bearing measurement device of weight-bearing equipment, comprising:

a weight sensor that is disposed on the weight-bearing equipment and comprises a deformable body and a bridge circuit, wherein the deformable body deforms under the action of gravity of a borne object, the bridge circuit comprises at least one resistance strain gauge that is disposed on the deformable body, and the bridge circuit is configured to generate an output voltage that represents the deformation under the action of an input voltage;

an acceleration sensor configured to detect acceleration components of the deformable body under the action of gravity of the borne object in a U direction, a V direction and a W direction, wherein the W direction is perpendicular to a bearing face of the deformable body, and the U direction, the V direction and the W direction are perpendicular to one another respectively; and a processing unit configured to calculate the gravity and/or the mass of the borne object in accordance with the acceleration components in the U direction, the V direction and the W direction, the input voltage, the output voltage and conversion coefficients of the bridge circuit in the U direction, the V direction and the W direction, wherein the conversion coefficient is a constant that represents a proportional relation between a stress in a corresponding single direction and the generated output voltage.

According to a second aspect of the present invention, there is further provided a weight-bearing measurement method of weight-bearing equipment. A weight sensor and an acceleration sensor are disposed on the weight-bearing equipment.

The weight sensor comprises a deformable body and a bridge circuit. The deformable body deforms under the action of gravity of a borne object. The bridge circuit comprises at least one resistance strain gauge that is disposed on the deformable body. The bridge circuit generates an output voltage that represents the deformation under the action of an input voltage. The input voltage is a fixed voltage that is loaded at an input end of the bridge circuit.

The weight-bearing measurement method comprises:

acquiring acceleration components, detected by the acceleration sensor, of the deformable body under the action of gravity of the borne object in a U direction, a V direction and a W direction in case of weight bearing, wherein the W direction is perpendicular to a bearing face of the deformable body, and the U direction, the V direction and the W direction are perpendicular to one another respectively;

acquiring an input voltage of the bridge circuit and an output voltage of the bridge circuit in case of weight bearing; and calculating the gravity and/or the mass of the borne object in accordance with the acceleration components in the U direction, the V direction and the W direction, the input voltage, the output voltage and conversion coefficients of the bridge circuit in the U direction, the V direction and the W direction, wherein the conversion coefficient is a constant that represents a proportional relation between a stress in a corresponding single direction and the generated output voltage.

According to a third aspect of the present invention, there is further provided weight-bearing equipment. The weight-bearing equipment comprises a bearing body for bearing an object, a movement mechanism disposed below the bearing body, a motor configured to drive the movement mechanism to move, a motor control device, and the weight-bearing measurement device according to the first aspect of the present invention. The weight-bearing measurement device is disposed in the bearing body and configured to calculate the gravity and/or the mass of a borne object in case of weight bearing and to provide the calculated gravity and/or mass to the motor control device, such that the motor control device may adjust an output torque of the motor in accordance with the gravity and/or the mass.

The embodiments of the present invention have a beneficial effect that the weight-bearing measurement method and device detect the acceleration components of the deformable body under the action of gravity of the borne object in the perpendicular to one another respectively U direction, V direction and W direction through the acceleration sensor, such that the gravity and/or the mass of the borne object may be determined in accordance with a relationship between the output voltage of the bridge circuit and the gravity components of the borne object in the U direction, the V direction and the W direction. Thus, even if the deformable body is in a tilted status, the gravity and/or the mass of the borne object may be accurately measured in accordance with the weight-bearing measurement method and device provided by the embodiments of the present invention. Further, accurate gravity and/or mass data may be provided to the motor control device of the weight-bearing equipment for accurate movement control.

BRIEF DESCRIPTION OF THE DRAWINGS

The drawings that are constitute a part of the description show the embodiments of the present invention and are intended to explain the principle of the invention together with the descriptions thereof.

DETAILED DESCRIPTION

Now, various embodiments of this invention will be described in detail with reference to the drawings. It should be noted that, unless specified otherwise, the relative arrangements of the members and steps, the mathematical formulas and numerical values described in these embodiments do not restrict the scope of the present invention.

The following descriptions for at least one embodiment are actually descriptive only, and shall not be intended to limit the present invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

<Weight-Bearing Measurement Device>

Figure 1:
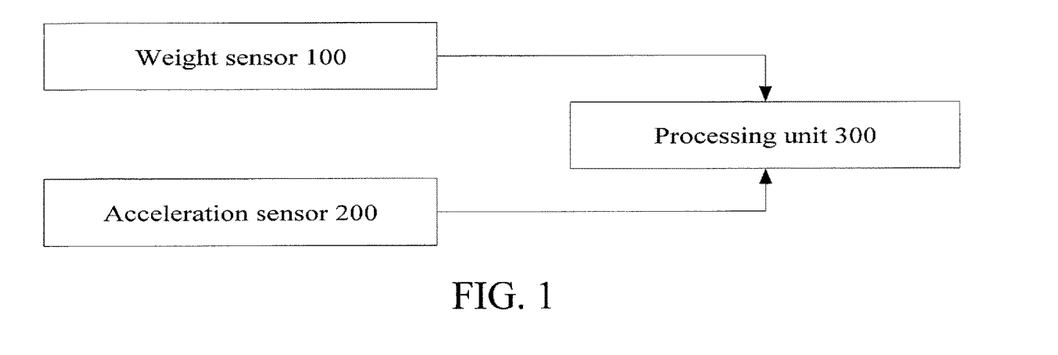
FIG. 1 is a functional block diagram of a weight-bearing measurement device according to an embodiment of the present invention.

FIG. 1 is a functional block diagram of a weight-bearing measurement device of weight-bearing equipment according to an embodiment of the present invention.

As shown in FIG. 1, the weight-bearing measurement device provided by the embodiment of the present invention comprises a weight sensor 100, an acceleration sensor 200 and a processing unit 300.

The weight sensor 100 is disposed on the weight-bearing equipment and configured to convert a mass signal into a measurable electrical signal for output.

Figure 2:
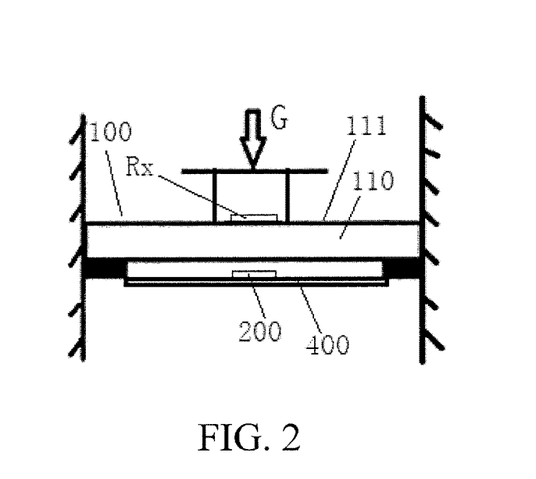
FIG. 2 is a structural schematic view of a weight-bearing measurement device according to an example of the present invention.
Figure 4:
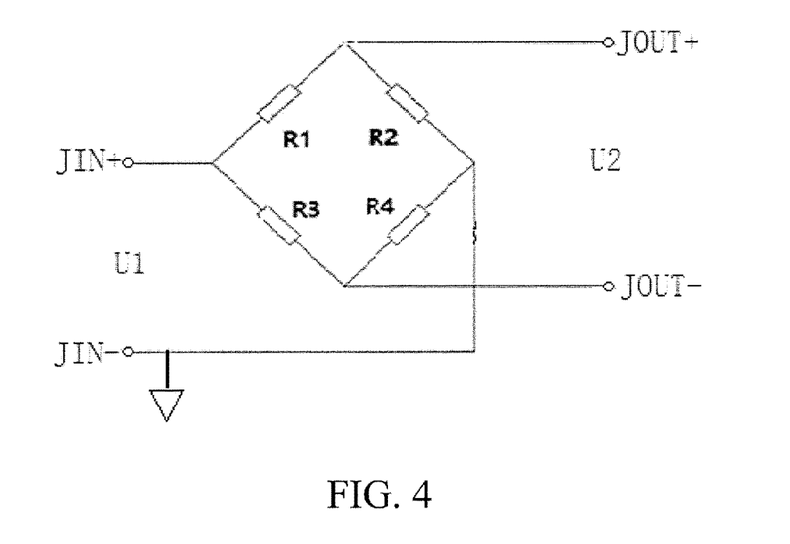
FIG. 4 is a functional block diagram of a bridge circuit according to an embodiment of the present invention.

The weight sensor 100 comprises a deformable body 110 as shown in FIG. 2 and a bridge circuit as shown in FIG. 4.

The deformable body 110 deforms under the action of gravity of a borne object.

The deformable body 110 of the weight sensor 100 is an elastic deformable body that may restore an original shape in a non-stressed status, such that the stability of accurate measurement is guaranteed.

The bridge circuit comprises at least one resistance strain gauge Rx as shown in FIG. 2. The resistance strain gauge Rx is disposed on the deformable body 110. A resistance of the resistance strain gauge Rx changes with deformation of the deformable body, such that an output voltage of the bridge circuit is changed.

As a deformation degree of the deformable body 110 corresponds to the resistance of the resistance strain gauge Rx, and the resistance variation of the resistance strain gauge Rx changes the output voltage of the bridge circuit, the bridge circuit may generate the output voltage that represents the deformation under the action of an input voltage.

The acceleration sensor 200 is configured to detect acceleration components of the deformable body 110 under the action of gravity of the borne object in a U direction, a V direction and a W direction. The W direction is perpendicular to a bearing face of the deformable body 110. The U direction, the V direction and the W direction are perpendicular to one another respectively. This shows that the V direction and the U direction are located on a plane that is parallel to the bearing face of the deformable body 110 and the V direction and the U direction are perpendicular to each other.

The borne object may directly act on the bearing face of the deformable body 110, and may also indirectly act on the bearing face 111 of the deformable body 110 via an intermediate force transfer substance as shown in FIG. 2. In this way, the deformable body 110 may be protected against damages by the intermediate force transfer substance.

The acceleration sensor 200 may comprise three uniaxial accelerometers and also may be an integrated triaxial accelerometer.

Owing to installation of the acceleration sensor 200, directions of three axes respectively correspond to the U direction, the V direction and the W direction, such that the acceleration components generated by the deformable body 110 in the U direction, the V direction and the W direction under the action of gravity of the borne object are detected.

Components of a gravity G in the U direction, the V direction and the W direction may be calculated in accordance with the acceleration components, which are generated by the deformable body 110 in the U direction, the V direction and the W direction under the action of gravity of the borne object, and the acceleration components are detected by the acceleration sensor 200.

Figure 3:
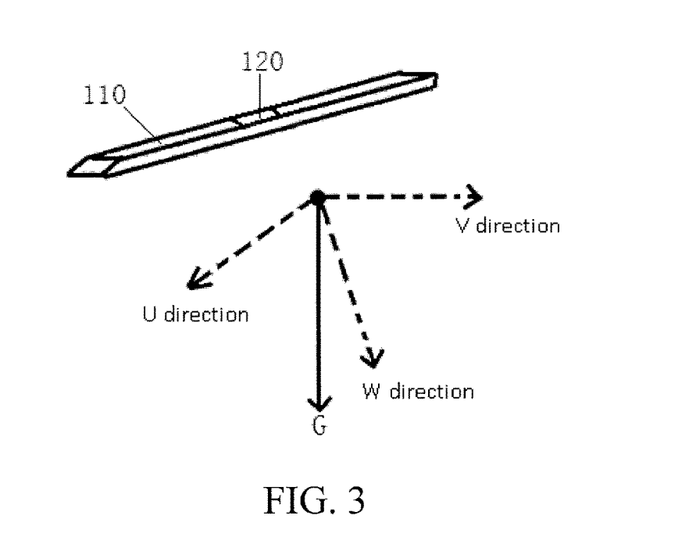
FIG. 3 is a schematic view of stress analysis on a deformable body according to an embodiment of the present invention.

Referring to FIG. 3, the component of the gravity G in the U direction is:

$$F_u = \frac{u \times G}{\sqrt{u^2 + v^2 + w^2}}.\qquad\text{Formula (1)}$$

Referring to FIG. 3, the component of the gravity G in the V direction is:

$$F_v = \frac{v \times G}{\sqrt{u^2 + v^2 + w^2}}.\qquad\text{Formula (2)}$$

Referring to FIG. 3, the component of the gravity G in the W direction is:

$$F_w = \frac{w \times G}{\sqrt{u^2 + v^2 + w^2}}.\qquad\text{Formula (3)}$$

In Formula (1), Formula (2) and Formula (3), G is gravity of the borne object, u is the acceleration component in the U direction, v is the acceleration component in the V direction, w is the acceleration component in the W direction, $F_u$ is the component of the gravity G in the U direction, $F_v$ is the component of the gravity G in the V direction, and $F_w$ is the component of the gravity G in the W direction.

The processing unit 300 is configured to calculate the gravity and/or the mass of the borne object in accordance with the acceleration components in the U direction, the V direction and the W direction, the input voltage and the output voltage of the bridge circuit, and the conversion coefficients of the bridge circuit in the U direction, the V direction and the W direction. The conversion coefficient is a constant that represents a proportional relation between a stress in a corresponding single direction and the generated output voltage.

Taking the conversion coefficient in the U direction as an example, the conversion coefficient is the constant that represents a proportional relation between a stress in the single U direction and the generated output voltage.

A relationship between the output voltage U2 and the components of the gravity G in the three directions, the input voltage U1 and the conversion coefficients in the three directions is:

$$U2 = Su \times U1 \times F_u + Sv \times U1 \times F_v + Sw \times U1 \times F_w \qquad\text{Formula (4)}.$$

In Formula (4), U2 is the output voltage of the bridge circuit, U1 is the input voltage of the bridge circuit, Su is the conversion coefficient in the U direction, Sv is the conversion coefficient in the V direction, Sw is the conversion coefficient in the W direction, $F_u$ is the component of the gravity G in the U direction, $F_v$ is the component of the gravity G in the V direction, and $F_w$ is the component of the gravity G in the W direction.

Based on Formula (1), Formula (2), Formula (3) and Formula (4), it can be concluded that:

$$G = \frac{U2 \times \left(\sqrt{u^2 + v^2 + w^2}\right)}{U1 \times (Su \times u + Sv \times v + Sw \times w)}.\qquad\text{Formula (5)}$$

Furthermore, the mass of the borne object is:

$$m = \frac{G}{g}.\qquad\text{Formula (6)}$$

In Formula (6), m is the mass of the borne object, and g is the gravity acceleration.

The processing unit 300 may comprise chips with computational processing capabilities, including a central processing unit, an MCU (Microcontroller Unit) and the like.

It can be seen that the weight-bearing measurement device provided by the embodiment of the present invention may detect the acceleration components of the deformable body 110 under the action of gravity of the borne object in the perpendicular to one another respectively U direction, V direction and W direction through the acceleration sensor 200, such that the gravity G and/or the mass m of the borne object may be determined in accordance with a relationship between the output voltage U2 of the bridge circuit and the components of the gravity G of the borne object in the U direction, the V direction and the W direction. Thus, even if the deformable body 110 is in a tilted status, the gravity G and/or the mass m of the borne object may be accurately measured through the weight-bearing measurement method of the present invention.

In an embodiment of the present invention, the deformable body 110 may be made of a metal material, for instance, iron, aluminum, an aluminium alloy material, an alloy steel material and a stainless steel material.

According to the embodiment of the present invention, the deformable body 110 has not only a relatively stronger capability of shape restoration after an external force disappears but also relatively high corrosion resistance, and may adapt to various application environments.

In an embodiment of the present invention, the U direction may be chosen as a length direction of the deformable body 110. Correspondingly, the V direction is a width direction of the deformable body. At least one of two ends of the deformable body 110 in the U direction is a fixed end of the deformable body 110.

According to the embodiment of the present invention, the length direction of the deformable body 110 is chosen as the U direction and the width direction of the deformable body 110 is chosen as the V direction, such that convenience is brought for accurately setting the wiring direction of the resistance strain gauge and for applying single-direction stress in corresponding directions during determination of the conversion coefficients in all the directions.

In an embodiment of the present invention, the acceleration sensor 200 and the weight sensor 100 may be arranged side by side in the W direction.

As the bearing face 111 of the deformable body 110 is parallel to planes where the U direction and the V direction are located, the deformable body 110 in at least one of the U direction and the V direction may be set to be larger than that in the W direction to increase a surface area that senses a gravity action of the borne object of the deformable body 110. Thus, according to the embodiment of the present invention, the acceleration sensor 200 and the weight sensor 100 are arranged side by side in the W direction to contribute to controlling an installing space taken up by the weight-bearing measurement device and improving structural compactness of the weight-bearing equipment.

Further, the weight-bearing measurement device may further be provided with a circuit board 400 as shown in FIG. 2. The circuit board 400 is parallel to the bearing face 111 of the deformable body 110. The acceleration sensor 200 is assembled on the circuit board 400. Posture data measured by the acceleration sensor 200 directly reflect a tilted posture of the deformable body 110.

Furthermore, the processing unit 300 may also be assembled on the circuit board 400.

According to the embodiment of the present invention, wiring of the acceleration sensor 200 and its connection with the circuit are facilitated.

FIG. 4 is a functional block diagram of a bridge circuit according to an embodiment of the present invention.

As shown in FIG. 4, the bridge circuit comprises four bridge arms that are respectively connected with four resistors including a resistor R1, a resistor R2, a resistor R3 and a resistor R4. One pair of diagonal points respectively serves as a positive input end JIN+ and a negative input end JIN− to be accessed into an input voltage U1. The other pair of diagonal points respectively serves as a positive output end JOUT+ and a negative output end JOUT− to provide an output voltage U2.

The resistor R1 is connected between the positive input end JIN+ and the positive output end JOUT+. The resistor R2 is connected between the positive output end JOUT+ and the negative input end JIN−. The resistor R3 is connected between the positive input end JIN+ and the negative output end JOUT−. The resistor R4 is connected between the negative output end JOUT− and the negative input end JIN−.

The bridge circuit has the following working principle. Resistances of the four resistors R1 to R4 are equal in a non-stressed status. At this time, the bridge circuit is in a balanced status and the output voltage U2 is 0. In a stressed status, at least one of the four resistors R1 to R4 may change its own resistance in a stressed status, such that a balanced status of the bridge circuit is broken, the output voltage U2 is no longer 0, and the value of the output voltage U2 may change as the stress changes. Thus, stressed deformation of the deformable body 110 is represented by the output voltage U2.

The bridge circuit may adopt three configuration structures, namely, a half-bridge single-arm structure, a half-bridge dual-arm structure and a full-bridge structure. The half-bridge single-arm structure is that only one of the four resistors R1 to R4 is a resistance strain gauge with a variable resistance and the other three resistors are resistors with fixed resistances. The half-bridge dual-arm structure is that two of the four resistors R1 to R4 are resistance strain gauges with variable resistances and the other two resistors are resistors with the fixed resistances. The full-bridge structure is that the four resistors R1 to R4 are resistance strain gauges with variable resistances.

The bridge circuit provided by the embodiment of the present invention may adopt any of the above working structures. Deformations of the deformable body 110 in the U direction, the V direction and the W direction may be sensed by the bridge circuit so long as at least one resistance strain gauge is disposed. Thus, the only requirement is to represent the deformations by the output voltage U2.

As for the half-bridge single-arm structure, taking the resistor R1 as the resistance strain gauge for example, the wiring direction of the resistor R1 may be set to be perpendicular to the W direction and form an angle with the U direction and the V direction. For example, the wiring direction of the resistor R1 forms an angle of 45 degrees with the U direction and the V direction respectively. In this way, the deformations of the deformable body 110 in the U direction, and the V direction and the W direction may be sensed by one resistance strain gauge.

As for the half-bridge dual-arm structure, taking the resistor R1 and the resistor R2 as the resistance stain sheets for example, the wiring direction of the resistor R1 may be set to be consistent with the V direction and the wiring direction of the resistor R2 may be set to be consistent with the U direction. In this way, the stressed deformations in the U direction and the W direction may be mainly sensed by the resistor R2 and the stressed deformations in the V direction and the W direction may be mainly sensed by the resistor R1.

As for the full-bridge structure, the four resistors R1 to R4 are all the resistance strain gauges.

In an embodiment of the present disclosure, the bridge circuit adopts the full-bridge structure. The resistor R1 corresponds to a first resistance strain gauge. The resistor R2 corresponds to a second resistance strain gauge. The resistor R3 corresponds to a third resistance strain gauge. The resistor R4 corresponds to a fourth resistance strain gauge.

In the embodiment of the present invention, compared with the half-bridge single-arm structure and the half-bridge dual-arm structure, the full-bridge structure has the highest sensitivity and may sense the deformation of the deformable body 110 very sensitively.

Figure 5:
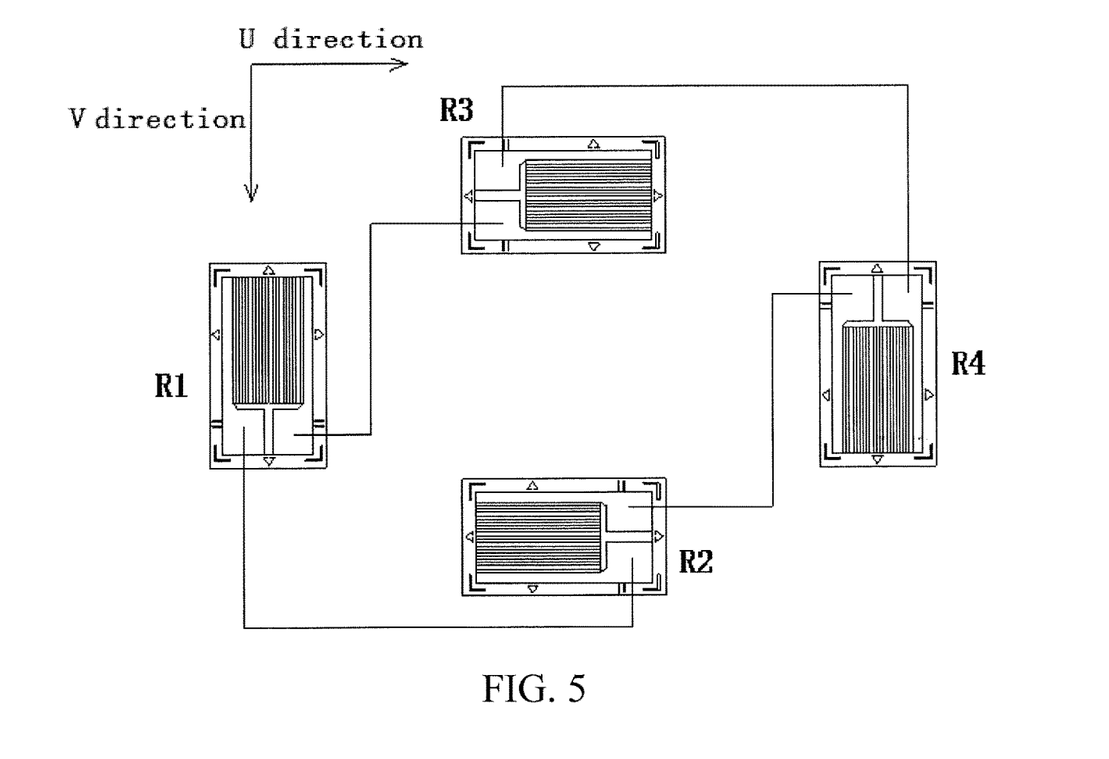
FIG. 5 is a layout structural schematic view of a strain sheet according to an embodiment of the present invention.

In an embodiment of the present invention, as shown in FIG. 5, on the basis that the bridge circuit adopts the full-bridge structure, the wiring directions of the second resistance strain gauge (corresponding to the resistor R2) and the third resistance strain gauge (corresponding to the resistor R3) are further set to be consistent with the U direction, and the wiring directions of the first resistance strain gauge (corresponding to the resistor R1) and the fourth resistance strain gauge (corresponding to the resistor R4) are further set to be consistent with the V direction. Alternatively, the wiring directions of the second resistance strain gauge and the third resistance strain gauge may be set to be consistent with the V direction, and the wiring directions of the first resistance strain gauge and the fourth resistance strain gauge may be set to be consistent with the U direction.

In the embodiment of the present disclosure, by taking that the wiring directions of the second resistance strain gauge and the third resistance strain gauge are set consistent with the U direction for example, the stress deformations of the deformable body 110 in the U direction and the W direction may be mainly sensed by a differential connection structure of the second resistance strain gauge and the third resistance strain gauge, and the stress deformations of the deformable body 110 in the V direction and the W direction may be mainly sensed by a differential connection structure of the first resistance strain gauge and the fourth resistance strain gauge. Thus, this differential connection structure can not only improve the capability that the bridge circuit represents the stress deformations in all direction via the output voltage U2, but also improve the signal strength of the output voltage U2, and the above improvement is particularly embodied in below.

(1) The size of the deformable body may be compressed in the U direction when the deformable body 110 is stressed in the U direction.

For the second resistance strain gauge and the third resistance strain gauge, this leads to compression in wiring direction, reduction in wiring length and resistance reduction.

For the first resistance strain gauge and the fourth resistance strain gauge, this leads to compression in cross-sectional direction, no influence on the wiring length and almost no resistance change. Cross-sectional changes may slightly affect the resistances, which may be negligible herein.

As the resistances of the second resistance strain gauge and the third resistance strain gauge are reduced while the resistances of the first resistance strain gauge and the fourth resistance strain gauge are unchanged, the output voltage U2 is negative, and the absolute value thereof is increased with increase of stress in the U direction. Besides, by adoption of this structure, a double output may be obtained in comparison with the half-bridge dual-arm structure.

(2) The size of the deformable body 110 may be compressed in the V direction when the deformable body 110 is stressed in the V direction.

For the first resistance strain gauge and the fourth resistance strain gauge, this leads to compression in wiring direction, reduction in wiring length and resistance reduction.

For the second resistance strain gauge and the third resistance strain gauge, this leads to compression in cross-sectional direction, no influence on the wiring length and almost no resistance change. Cross-sectional changes may slightly affect the resistances, which may be negligible herein.

As the resistances of the first resistance strain gauge and the fourth resistance strain gauge are reduced while the resistances of the second resistance strain gauge and the third resistance strain gauge are unchanged, the output voltage U2 is positive, and the absolute value thereof is increased with increase of stress in the V direction. Besides, by adoption of this structure, a double output may be obtained in comparison with the half-bridge dual-arm structure.

(3) The size of the deformable body 110 may be not only compressed but also distorted because the deformable body 110 has a relatively smaller size in the W direction when the deformable body 110 is stressed in the W direction.

For the second resistance strain gauge and the third resistance strain gauge, this leads to lengthening of metal wires thereon due to distortion, thinning of the cross sections and resistance increase.

For the first resistance strain gauge and the fourth resistance strain gauge, this leads to compression and reduction of lengths of metal wires thereon due to distortion and resistance reduction.

As the resistances of the second resistance strain gauge and the third resistance strain gauge are increased while the resistances of the first resistance strain gauge and the fourth resistance strain gauge are reduced, the output voltage U2 is positive and is increased with increase of stress in the W direction. Besides, by adoption of this structure, a double output may be obtained in comparison with the half-bridge dual-arm structure.

It can seen that in the embodiment of the present invention, stresses of the deformable body 110 in different directions may lead to different resistance changes of the four resistance strain gauges. Thus, the bridge circuit has a relatively stronger capability of representing the stress deformations in all the directions through the output voltage U2. The signal strength of the output voltage U2 is improved by means of differential connection.

EXAMPLE

FIG. 2 is a structural schematic view of a weight-bearing measurement device according to an example of the present invention.

In the example as shown in FIG. 2, the U direction is chosen as the length direction of the deformable body 110. The V direction is chosen as the width direction of the deformable body 110. The W direction is chosen as a height direction of the deformable body 110.

The two ends of the deformable body 110 in the U direction are the fixed ends of the deformable body 110. The bearing face 111 of the deformable body 110 is located in an area between the two fixed ends.

At least one resistance strain gauge Rx is disposed on the bearing face of the deformable body 110, such that the deformation of the deformable body 110 may be sensed to the utmost extent and the signal strength of the output voltage U2 may be improved.

In the example as shown in FIG. 2, the acceleration sensor 200 and the weight sensor 100 are arranged in the W direction. The acceleration sensor 200 is located below the weight sensor 100.

In the example as shown in FIG. 2, the acceleration sensor 200 and the computing unit 300 of the weight-bearing measurement device are assembled on the circuit board 400.

In the example as shown in FIG. 2, the bridge circuit is of the full-bridge structure. The four resistance strain gauges Rx are disposed on the bearing face 111 of the deformable body 110.

<Weight-Bearing Measurement Method>

Figure 6:
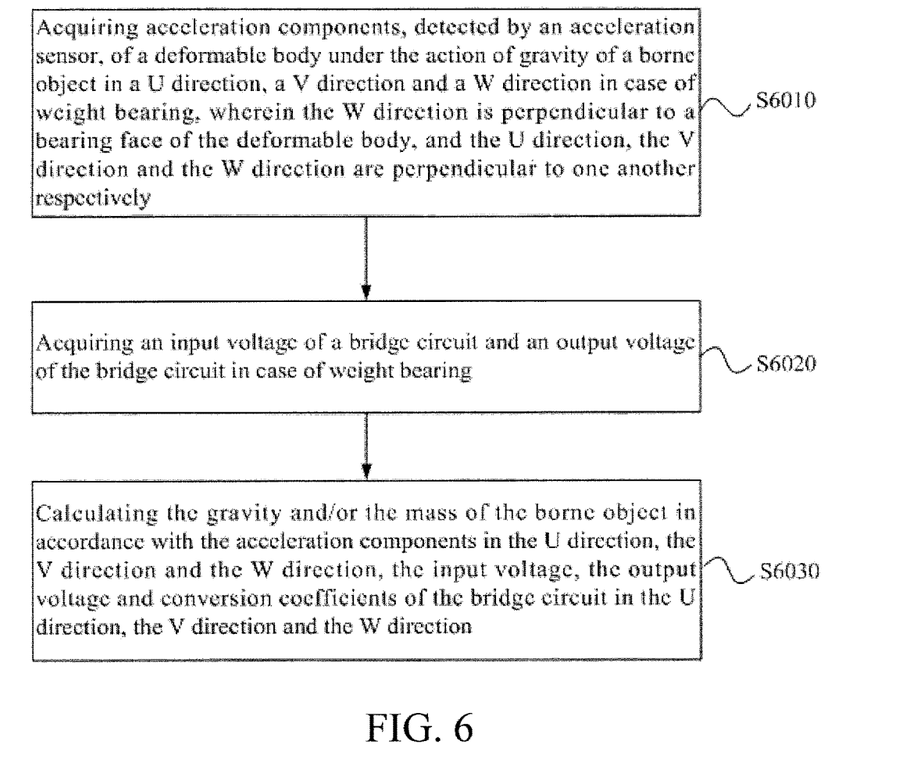
FIG. 6 is a flow chart of a weight-bearing measurement method according to an embodiment of the present invention.

FIG. 6 is a flow chart of a weight-bearing measurement method of weight-bearing equipment according to an embodiment of the present invention.

A weight sensor and an acceleration sensor, for example, a weight sensor 100 and an acceleration sensor 200, are disposed on the weight-bearing equipment.

The weight sensor 100 comprises a deformable body 110 as shown in FIG. 2 and FIG. 3 and a bridge circuit as shown in FIG. 4. The deformable body 110 deforms under the action of gravity of a borne object. The bridge circuit comprises at least one resistance strain gauge that is disposed on the deformable body. The bridge circuit generates an output voltage that represents the deformation under the action of an input voltage. The input voltage is a fixed voltage that is loaded at an input end of the bridge circuit.

As shown in FIG. 6, the weight-bearing measurement method comprises:

step S6010: acquiring acceleration components, detected by the acceleration sensor 200, of the deformable body 110 under the action of gravity of the borne object in a U direction, a V direction and a W direction in case of weight bearing, wherein the W direction is perpendicular to a bearing face 111 of the deformable body 110, and the U direction, the V direction and the W direction are perpendicular to one another respectively;

step S6020: acquiring an input voltage U1 of the bridge circuit and an output voltage U2 of the bridge circuit in case of weight bearing; and step S6030: calculating the gravity and/or the mass of the borne object in accordance with the acceleration components in the U direction, the V direction and the W direction, the input voltage, the output voltage and conversion coefficients of the bridge circuit in the U direction, the V direction and the W direction, wherein the conversion coefficient is a constant that represents a proportional relation between a stress in a corresponding single direction and the generated output voltage.

In step S6030, the gravity G and/or the mass m of the borne object may be calculated in accordance with the formulas (5) and (6).

The weight-bearing measurement method may detect the acceleration components of the deformable body 110 under the action of gravity of the borne object in the U direction, V direction and W direction which are perpendicular to one another respectively through the acceleration sensor 200, such that the gravity G and/or the mass m of the borne object may be determined in accordance with a relationship between the output voltage U2 of the bridge circuit and the components of the gravity G of the borne object in the U direction, the V direction and the W direction. Thus, even if the deformable body 110 is in a tilted status, the gravity G and/or the mass m of the borne object may be accurately measured through the weight-bearing measurement method.

According to the embodiment of the present invention, before calculation of the gravity and/or the mass of the borne object, the weight-bearing measurement method further comprises the step of acquiring conversion coefficients of the bridge circuit in the U direction, the V direction and the W direction.

According to an embodiment of the present invention, the conversion coefficients in the U direction, the V direction and the W direction may be factory defaults. That is, the conversion coefficients in the three directions are set in a storage unit of a computing unit that implements the weight-bearing measurement method upon delivery. At this time, acquiring the conversion coefficients of the bridge circuit in the U direction, the V direction and the W direction includes acquiring the conversion coefficient factory defaults, stored in the storage unit, of the bridge circuit in the U direction, the V direction and the W direction.

According to an embodiment of the present invention, the conversion coefficients in the U direction, the V direction and the W direction may be generated by a test of acquiring the corresponding output voltage U2 of the bridge circuit in presence of a plurality of sets of known test data. Each set of known test data comprise the input voltage U1, a stress direction and a stress strength in the corresponding stress direction. The stress direction is any one of the U direction, the V direction and the W direction. At this time, acquiring the conversion coefficients of the bridge circuit in the U direction, the V direction and the W direction includes acquiring the conversion coefficients, obtained through the test, of the bridge circuit in the U direction, the V direction and the W direction.

In the embodiment of the present invention, a method for obtaining the conversion coefficients through the test is as below.

(1) During test of the conversion coefficient in the U direction, all sets of test date are selected.

For each set of test data, the value of the output voltage U2 is read and the conversion coefficient in the U direction is calculated with reference to the following Formula (7):

$$U2 = Su \times U1 \times Fu \qquad \text{Formula (7).}$$

In Formula (7), Fu is the stress of the deformable body 110 in the single U direction.

The final conversion coefficient in the U direction may be determined according to the conversion coefficient, obtained through the plurality of sets of test data, in the U direction by an averaging method for example.

Averaging may be performed after deletion of the maximum value and the minimum value during computation of the average value.

(2) During test of the conversion coefficient in the V direction, all sets of test date are selected.

For each set of test data, the value of the output voltage U2 is read and the conversion coefficient in the V direction is calculated with reference to the following Formula (8):

$$U2 = Sv \times U1 \times Fv \qquad \text{Formula (8).}$$

In Formula (8), Fv is the stress of the deformable body 110 in the single V direction.

The final conversion coefficient in the V direction may be determined according to the conversion coefficient, obtained through the plurality of sets of test data, in the V direction by an averaging method for example.

(3) During test of the conversion coefficient in the W direction, all sets of test date are selected.

For each set of test data, the value of the output voltage U2 is read and the conversion coefficient in the W direction is calculated with reference to the following Formula (9):

$$U2 = Sw \times U1 \times Fw \qquad \text{Formula (9).}$$

In Formula (9), Fw is the stress of the deformable body 110 in the single W direction.

The final conversion coefficient in the W direction may be determined according to the conversion coefficient, obtained through the plurality of sets of test data, in the W direction by an averaging method for example.

According to the embodiment of the present invention, the conversion coefficients in all the directions may be obtained through the test in an application environment of the weight-bearing equipment, which facilitates improvement of the accuracy of the conversion coefficient and further improves the measurement accuracy.

In an embodiment of the present invention, the weight-bearing measurement method may further comprise the following step: disposing four resistance strain gauges on the deformable body to build the bridge circuit, wherein the first resistance strain gauge is connected between a positive input end and a positive output end, the second resistance strain gauge is connected between the positive output end and a negative input end, the third resistance strain gauge is connected between the positive input end and a negative output end, the fourth resistance strain gauge is connected between the negative output end and the negative input end, the bridge circuit receives the input voltage through the positive input end and the negative input end and provides the output voltage through the positive output end and the negative output end.

In an embodiment of the present invention, the weight-bearing measurement method may further comprise the following step: disposing four resistance strain gauges on the deformable body to build the bridge circuit, wherein the wiring directions of the second resistance strain gauge and the third resistance strain gauge are consistent with the U direction, and the wiring directions of the first resistance strain gauge and the fourth resistance strain gauge are consistent with the V direction, alternatively, the wiring directions of the second resistance strain gauge and the third resistance strain gauge are consistent with the V direction, and the wiring directions of the first resistance strain gauge and the fourth resistance strain gauge is consistent with the U direction.

In an embodiment of the present invention, the weight-bearing measurement method may further comprise the following step:

Arranging the acceleration sensor and the weight sensor in the W direction.

In an embodiment of the present invention, the weight-bearing measurement method may further comprise the following the steps: setting the U direction to be consistent with the length direction of the deformable body; and setting that at least one of two ends of the deformable body in the U direction is a fixed end of the deformable body.

In the weight-bearing measurement device, the processing unit 300 may be configured to implement the weight-bearing measurement method of the embodiment of the present invention. The weight-bearing measurement device may further comprise a storage unit that is configured to store an instruction. The instruction is configured to control the processing unit for operation to execute the weight-bearing measurement method according to the embodiment of the present invention.

For example, the processing unit 300 may comprise an MCU or a central processing unit or the like.

<Weight-Bearing Equipment>

Figure 7:
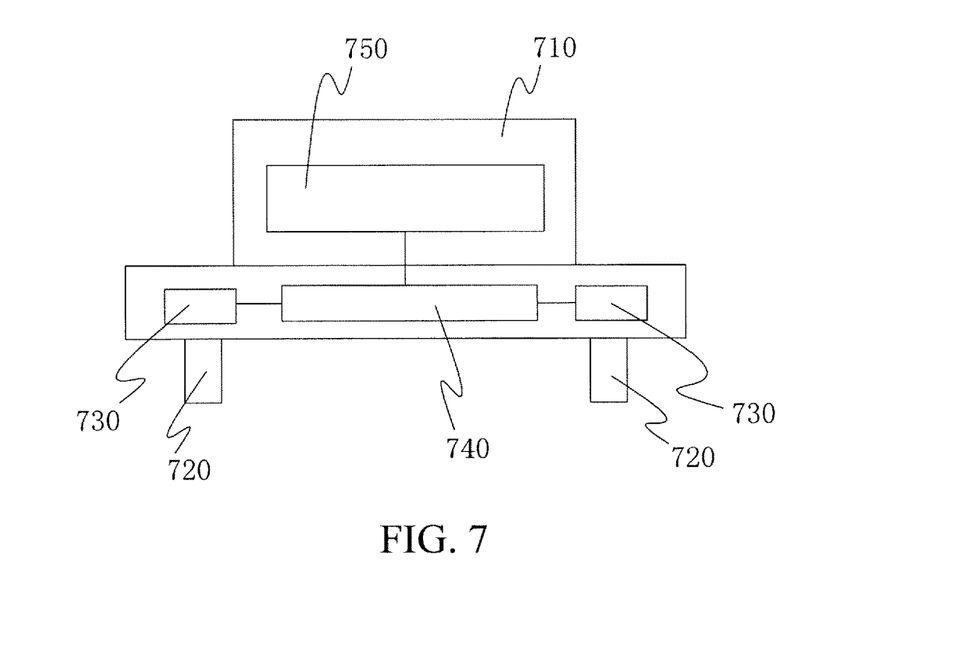
FIG. 7 is a functional block diagram of weight-bearing equipment according to an embodiment of the present invention.

FIG. 7 is a structural schematic view of weight-bearing equipment according to an embodiment of the present invention.

As shown in FIG. 7, the weight-bearing equipment provided by the embodiment of the present invention comprises a bearing body 710 configured to bear an object, a movement mechanism 720 disposed below the bearing body 710, a motor 730 configured to drive the movement mechanism 720 to move, a motor control device 740, and the weight-bearing measurement device according to any of the embodiments of the present invention. The weight-bearing measurement device is marked as 750 in FIG. 7.

The weight-bearing measurement device 750 is disposed in the bearing body 710 and configured to calculate the gravity and/or the mass of a borne object in case of weight bearing and to provide the calculated gravity and/or mass to the motor control device 740, such that the motor control device 740 may adjust an output torque of the motor 730 in accordance with the gravity and/or the mass.

It can be seen that the weight-bearing measurement device provided by the embodiment of the present invention may detect acceleration components of the deformable body 110 under the action of gravity of the borne object in perpendicular to one another respectively U direction, V direction and W direction through the acceleration sensor 200, such that the gravity G and/or the mass m of the borne object may be determined in accordance with a relationship between the output voltage U2 of the bridge circuit and the components of the gravity G of the borne object in the U direction, the V direction and the W direction. Thus, even if the deformable body 110 is in a tilted status, the gravity G and/or the mass m of the borne object may be accurately measured through the weight-bearing measurement method. Further, the accurate gravity G and/or mass m may be provided for the motor control device 740 of the weight-bearing equipment for accurate movement control.

In an embodiment of the present invention, the weight-bearing equipment is a balance car or an automated guided vehicle AGV.

Those skilled in the art shall well know that, as electronic and information technologies such as large scale integrated circuit technologies develop and the trend that software are realized by hardware advances, it becomes difficult to distinguish software and hardware of computer systems, since any operation or execution of any instruction can be realized by software or hardware. Whether to realize a function of a machine using a software or hardware solution may depend on non-technical factors such as prices, speeds, reliability, storage capacity, change period etc. Therefore, a more direct and clear description manner of a technical solution to a person skilled in the fields of electronic and information technologies may be descriptions of the operations of the solution. When knowing the operations to be performed, those skilled in the art may directly design desired products based on considerations of the non-technical factors.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is well-known to a person skilled in the art that the implementations of using hardware, using software or using the combination of software and hardware can be equivalent with each other.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is defined by the attached claims.

The invention claimed is:

1. A weight-bearing measurement device of weight-bearing equipment, comprising:
   a weight sensor that is disposed on the weight-bearing equipment, the weight sensor comprises a deformable elastic body and a bridge circuit, wherein the deformable body deforms under the action of gravity of a borne object, the bridge circuit comprises at least one resistance strain gauge that is disposed on a bearing face of the deformable body, and the bridge circuit is configured to generate an output voltage (U2) that represents the deformation under the action of an input voltage (U1);

an acceleration sensor configured to detect an acceleration component (u) in a U direction, an acceleration component (v) in a V direction and an acceleration component (w) in a W direction of the deformable body under the action of gravity of the borne object, wherein the W direction is perpendicular to the bearing face of the deformable body, and the U direction, the V direction and the W direction are perpendicular to one another respectively;

a processing unit configured to calculate the gravity (G) and/or the mass (m) of the borne object in accordance with the acceleration components (u) in the U direction, the acceleration component (v) in the V direction and the acceleration component (w) in the W direction, the input voltage (U1), the output voltage (U2) and a conversion coefficient (Su) in the U direction, a conversion coefficient (Sv) in the V direction and a conversion coefficient (Sw) in the W direction of the bridge circuit, using the following equations, $$G = \frac{U2 \times \left(\sqrt{u^2 + v^2 + w^2}\right)}{U1 \times (Su \times u + Sv \times v + Sw \times w)};$$

$$m = \frac{G}{g};$$

and a circuit board that is parallel to the bearing face, wherein the acceleration sensor and the processing unit are disposed on the circuit board, wherein each of the conversion coefficients is a constant that represents a proportional relation between a stress in a corresponding single direction and the generated output voltage.

2. The weight-bearing measurement device according to claim 1, wherein the U direction is a length direction of the deformable body, and at least one of two ends of the deformable body in the U direction is a fixed end of the deformable body.

3. The weight-bearing measurement device according to claim 1, wherein the acceleration sensor and the weight sensor are arranged side by side in the W direction.

4. The weight-bearing measurement device according to claim 1, wherein the bridge circuit comprises four resistance strain gauges, wherein a first resistance strain gauge is connected between a positive input end and a positive output end, a second resistance strain gauge is connected between the positive output end and a negative input end, a third resistance strain gauge is connected between the positive input end and a negative output end, and a fourth resistance strain gauge is connected between the negative output end and the negative input end, and wherein the bridge circuit receives the input voltage through the positive input end and the negative input end and provides the output voltage through the positive output end and the negative output end.

5. The weight-bearing measurement device according to claim 4, wherein the bridge circuit comprises the four resistance strain gauges, wherein the wiring directions of the second resistance strain gauge and the third resistance strain gauge are consistent with the U direction, and the wiring directions of the first resistance strain gauge and the fourth resistance strain gauge are consistent with the V direction; or alternatively, the wiring directions of the second resistance strain gauge and the third resistance strain gauge are consistent with the V direction, and the wiring directions of the first resistance strain gauge and the fourth resistance strain gauge are consistent with the U direction.

6. A weight-bearing equipment, comprising a bearing body for bearing an object, a movement mechanism disposed below the bearing body, a motor configured to drive the movement mechanism to move, a motor control device, and a weight-bearing measurement device according to claim 1, wherein the weight-bearing measurement device is disposed in the bearing body and configured to calculate the gravity and/or the mass of a borne object in case of weight bearing and to provide the calculated gravity and/or mass to the motor control device, such that the motor control device may adjust an output torque of the motor in accordance with the gravity and/or the mass.

7. The weight-bearing equipment according to claim 6, wherein the weight-bearing equipment is a balance car or an automated guided vehicle AGV.

8. The weight-bearing equipment according to claim 6, wherein the U direction is a length direction of the deformable body, and at least one of two ends of the deformable body in the U direction is a fixed end of the deformable body.

9. The weight-bearing equipment according to claim 6, wherein the acceleration sensor and the weight sensor are arranged side by side in the W direction.

10. A weight-bearing measurement method of weight-bearing equipment, wherein the weight-bearing equipment is provided with a weight sensor, an acceleration sensor, a processing unit, and a circuit board, wherein the weight sensor comprises a deformable elastic body and a bridge circuit, the deformable body deforms under the action of gravity of a borne object, the bridge circuit comprises at least one resistance strain gauge that is disposed on a bearing face of the deformable body, the bridge circuit generates an output voltage (U2) that represents the deformation under the action of an input voltage (U1), and the input voltage is a fixed voltage that is loaded at an input end of the bridge circuit, wherein the weight-bearing measurement method comprises:

acquiring an acceleration component (u) in a U direction, an acceleration component (v) in a V direction and an acceleration component (w) in a W direction, detected by the acceleration sensor, of the deformable body under the action of gravity of the borne object in case of weight bearing, wherein the W direction is perpendicular to the bearing face of the deformable body, and the U direction, the V direction and the W direction are perpendicular to one another respectively;

acquiring the input voltage (U1) of the bridge circuit and the output voltage (U2) of the bridge circuit in case of weight bearing; and calculating, by the acceleration sensor, the gravity (G) and/or the mass (m) of the borne object in accordance with the acceleration components (u) in the U direction, the acceleration component (v) in the V direction and the acceleration component (w) in the W direction, the input voltage (U1), the output voltage (U2) and a conversion coefficient (Su) in the U direction, a conversion coefficient (Sv) in the V direction and a conversion coefficient (Sw) in the W direction of the bridge circuit using the following equations, $$G = \frac{U2 \times \left(\sqrt{u^2 + v^2 + w^2}\right)}{U1 \times (Su \times u + Sv \times v + Sw \times w)};$$

$$m = \frac{G}{g},$$

and
- wherein the circuit board is parallel to the bearing face, and the acceleration sensor and the processing unit are disposed on the circuit board, and
- wherein each of the conversion coefficients is a constant that represents a proportional relation between a stress in a corresponding single direction and the generated output voltage.

11. The weight-bearing measurement method according to claim 10, wherein
- the conversion coefficients are factory defaults; alternatively,
- the conversion coefficients are generated by a test of acquiring a corresponding output voltage of the bridge circuit in presence of a plurality of sets of known test data, wherein each set of known test data comprise the input voltage, a stress direction and a stress strength in the corresponding stress direction, and the stress direction is any one of the U direction, the V direction and the W direction.

12. The weight-bearing measurement method according to claim 10, further comprising:
- arranging the acceleration sensor and the weight sensor in the W direction.

13. The weight-bearing measurement method according to claim 10, further comprising:
- disposing four resistance strain gauges on the deformable body to build the bridge circuit,
- wherein a first resistance strain gauge is connected between a positive input end and a positive output end, a second resistance strain gauge is connected between the positive output end and a negative input end, a third resistance strain gauge is connected between the positive input end and a negative output end, a fourth resistance strain gauge is connected between the negative output end and the negative input end, the bridge circuit receives the input voltage through the positive input end and the negative input end and provides the output voltage through the positive output end and the negative output end.

14. The weight-bearing measurement method according to claim 13, wherein the step of disposing four resistance strain gauges on the deformable body to build the bridge circuit comprises:
- setting the wiring directions of the second resistance strain gauge and the third resistance strain gauge to be consistent with the U direction, and setting the wiring directions of the first resistance strain gauge and the fourth resistance strain gauge to be consistent with the V direction; alternatively, setting the wiring directions of the second resistance strain gauge and the third resistance strain gauge to be consistent with the V direction, and setting the wiring directions of the first resistance strain gauge and the fourth resistance strain gauge to be consistent with the U direction.

15. The weight-bearing equipment according to claim 14, wherein the bridge circuit comprises the four resistance strain gauges,
- wherein the wiring directions of the second resistance strain gauge and the third resistance strain gauge are consistent with the U direction, and the wiring directions of the first resistance strain gauge and the fourth resistance strain gauge are consistent with the V direction; or alternatively, the wiring directions of the second resistance strain gauge and the third resistance strain gauge are consistent with the V direction, and the wiring directions of the first resistance strain gauge and the fourth resistance strain gauge are consistent with the U direction.

16. The weight-bearing equipment according to claim 14, wherein the U direction is a length direction of the deformable body, and at least one of two ends of the deformable body in the U direction is a fixed end of the deformable body.

* * * * *